US008793220B2

(12) United States Patent
Peairs et al.

(10) Patent No.: US 8,793,220 B2
(45) Date of Patent: Jul. 29, 2014

(54) AUTOMATIC DOCUMENT ARCHIVING FOR A COMPUTER SYSTEM

(75) Inventors: Mark Peairs, Menlo Park, CA (US);
Jonathan J. Hull, Cupertino, CA (US);
John Cullen, Redwood City, CA (US);
Kiyoshi Suzuki, Tokyo (JP)

(73) Assignees: Ricoh Company, Ltd., Tokyo (JP);
Ricoh Corporation, West Caldwell, NJ (US)

( * ) Notice: Subject to any disclaimer, the term of this patent is extended or adjusted under 35 U.S.C. 154(b) by 1868 days.

(21) Appl. No.: 11/031,968

(22) Filed: Jan. 6, 2005

(65) Prior Publication Data
US 2005/0216437 A1  Sep. 29, 2005

Related U.S. Application Data

(63) Continuation of application No. 09/759,002, filed on Jan. 11, 2001, now Pat. No. 6,957,235, which is a continuation of application No. 08/938,137, filed on Sep. 26, 1997, now Pat. No. 6,199,073, which is a continuation-in-part of application No. 08/754,721, filed on Nov. 21, 1996, now Pat. No. 5,978,477.

(51) Int. Cl.
*G06F 7/00* (2006.01)
*G06F 17/30* (2006.01)

(52) U.S. Cl.
USPC ........................................................ 707/670

(58) Field of Classification Search
USPC ........................ 707/608, 640, 661, 668, 670
See application file for complete search history.

(56) References Cited

U.S. PATENT DOCUMENTS

| 4,358,824 | A |   | 11/1982 | Glickman et al. |
|---|---|---|---|---|
| 4,509,139 | A |   | 4/1985 | Creager, Sr. |
| 4,941,125 | A |   | 7/1990 | Boyne |
| 5,187,750 | A | * | 2/1993 | Behera ........................... 382/140 |
| 5,459,579 | A | * | 10/1995 | Hu et al. ........................ 358/296 |
| 5,619,649 | A | * | 4/1997 | Kovnat et al. ................ 358/1.15 |
| 5,689,755 | A | * | 11/1997 | Ataka ............................... 399/8 |

(Continued)

FOREIGN PATENT DOCUMENTS

| DE | 40 02 298 A1 | 8/1991 |
|---|---|---|
| WO | WO 92/14204 | 8/1992 |
| WO | WO 94/18634 | 8/1994 |

OTHER PUBLICATIONS

Andreadis, I., et al., A New ASIC for Real-Time Linear Color Space Transforms, Real-Time Imaging, vol. 1, No. 5, Nov. 1, 1995, © Academic Press Limited, pp. 373-379.

(Continued)

*Primary Examiner* — Robert Beausoliel, Jr.
*Assistant Examiner* — Hexing Liu
(74) *Attorney, Agent, or Firm* — Blakely, Sokoloff, Taylor & Zafman LLP

(57) ABSTRACT

A system and method for processing documents is described. The system and method provide for executing a command as part of the execution of an application program, where execution of the command causes the transfer of the document between a processing device in a computer system and a peripheral device. The present invention also provides for transferring the document data between the processing device and the peripheral device in response to the command. The present invention further provides for archiving the document data in a memory in the computer system in response to the command and transparently to the execution of the application program.

16 Claims, 4 Drawing Sheets

(56) References Cited

U.S. PATENT DOCUMENTS

| | | | | |
|---|---|---|---|---|
| 5,701,183 | A | * | 12/1997 | Bellemare et al. ............ 358/404 |
| 5,706,457 | A | * | 1/1998 | Dwyer et al. ................ 715/835 |
| 5,731,988 | A | | 3/1998 | Zandi et al. |
| 5,742,807 | A | | 4/1998 | Masinter |
| 5,754,308 | A | * | 5/1998 | Lopresti et al. ............... 358/403 |
| 5,764,972 | A | * | 6/1998 | Crouse et al. ........................ 1/1 |
| 5,802,373 | A | | 9/1998 | Yates et al. |
| 5,812,747 | A | * | 9/1998 | Kayano et al. ............. 358/1.15 |
| 5,832,474 | A | | 11/1998 | Lopresti et al. |
| 5,848,413 | A | | 12/1998 | Wolff |
| 5,880,447 | A | * | 3/1999 | Okada et al. ................. 235/380 |
| 5,892,900 | A | * | 4/1999 | Ginter et al. ..................... 726/26 |
| 5,893,908 | A | | 4/1999 | Cullen et al. |
| 5,924,074 | A | | 7/1999 | Evans |
| 5,978,477 | A | | 11/1999 | Hull et al. |
| 6,115,509 | A | * | 9/2000 | Yeskel ........................ 382/309 |
| 6,199,073 | B1 | | 3/2001 | Peairs et al. |
| 6,496,922 | B1 | | 12/2002 | Borrill |
| 6,592,629 | B1 | | 7/2003 | Cullen et al. |
| 6,665,086 | B2 | | 12/2003 | Hull et al. |
| 6,704,118 | B1 | | 3/2004 | Hull et al. |
| 6,957,235 | B2 | | 10/2005 | Peairs et al. |

OTHER PUBLICATIONS

Bhasker, Bharat, et al., Architecture and Implementation of an On-Line Data Archive and Distribution System, Twelfth IEEE Symposium on Mass Storage Systems, © 1993 IEEE, pp. 177-182.

Le, Bich C., An Out-of-Order Execution Technique for Runtime Binary Translators, ASPLOS VIII, 10/98 CA, USA, © 1998 ACM, pp. 151-158.

Meyer, Eric A., et al., Borealis Image Server, Computer Networks and ISDN Systems, vol. 28, Issue 11, May 1996, Published by Elsevier Science B.V., pp. 1123-1137.

Saarinen, Kari, Comparison of Decimation and Interpolation Methods in Case of Multiple Repeated RGB-YCbCr Colour Image Format Conversions, International Symposium on Circuits and Systems (ISCAS) Communication and Visual Signal Processing (CVSP), London, May 30-Jun. 2, 1994, vol. 3, May 30, 1994, pp. 269-272.

Amdahl Lifts the Veil on Its Enterprise Solutions Concept of Co-Operative Computing (Amdahl Corp.'s Enterprise Solutions open systems strategy) Computergram International, n1683, CGI05240007, May 24, 1991, Copyright 1991 Apt Data Services (UK) 2 pages.

ArcTIS-The key to a standard data format, Computing, Hewlett Packard, http://www.hp.com/tis/modules/arctis/arctis.htm, Hewlett-Packard GmbH, Herrenberger Strasse 130, D-71304 Boblingen, Aug. 31, 1995, 6 pages.

Integrated YUV to Red Green Blue Conversion, IBM Technical Disclosure Bulletin, vol. 37, No. 05, May 1994, IBM Corp., Armonk, NY, US, pp. 275-278.

Customised Database Applications, Netscape, 1999, 4 pages.

Optical Archiving (Document Archive document management software from laser/Data Services Inc for optical drives on IBM AS/400s) (Brief Article) (Product Announcement), Midrange Systems, v7, n17, p. 42(1), Sep. 16, 1994, Copyright 1994 Cardinal Business Media Inc., 1 page.

* cited by examiner

AUTOMATIC DOCUMENT ARCHIVING FOR A COMPUTER SYSTEM

This application claims priority to and is a continuation of application Ser. No. 09/759,002, entitled "AUTOMATIC DOCUMENT ARCHIVING FOR A COMPUTER SYSTEM," filed Jan. 11, 2001 now U.S. Pat No. 6,957,235 and assigned to the corporate assignee of the present invention, which is a continuation of application Ser No. 08/938,137 filed Sep. 26, 1997, now U.S. Pat. No. 6,199,073, entitled "AUTOMATIC ARCHIVING OF DOCUMENTS DURING THEIR TRANSFER BETWEEN A PERIPHERAL DEVICE AND A PROCESSING DEVICE," issued Mar. 6, 2001 and assigned to the corporate assignee of the present invention, which is a continuation-in-part of application Ser. No. 08/754,721 filed Nov. 21, 1996, now U.S. Pat. No. 5,978,477, entitled "AUTOMATIC AND TRANSPARENT DOCUMENT ARCHIVING," issued Nov. 2, 1999 and assigned to the corporate assignee of the present invention.

FIELD OF THE INVENTION

The present invention relates to the field of document management systems; more particularly, the present invention relates to providing automatic archiving for computer systems.

BACKGROUND OF THE INVENTION

Traditionally, document management required that vast amounts of documents be shipped to storage facilities only to necessitate retrieval when needed. The result was an inordinate and unnecessary expense of both time and money. Recently, however, the cost of storing an image of a sheet of paper on digital media has become less than the cost of printing and storing the sheet of paper itself. This development has been produced by the rapid development of storage system technology.

Managing conventional digital document storage systems may present several problems. Conventional document storage systems require that a user manually scan every document on a digital scanner in order to create an image of a document that may be archived in digital storage. Consequently, in order to archive a document, a scanner must be available to the potential user. Notwithstanding the availability of a scanner, a user must remember that a document needs to be scanned in order to create an archive. In addition, the scanning process may be time consuming if it is necessary to scan thousands of document pages. Therefore, an automatic digital document management system is desired.

SUMMARY OF THE INVENTION

A system and method for processing documents is described. The system and method provide for executing a command as part of the execution of an application program, where execution of the command causes the transfer of the document between a processing device in a computer system and a peripheral device. The present invention also provides for transferring the document data between the processing device and the peripheral device in response to the command. The present invention further provides for archiving the document data in a memory in the computer system in response to the command and transparently to the execution of the application program.

BRIEF DESCRIPTION OF THE DRAWINGS

The present invention is illustrated by way of example and not limited to the figures of the accompanying drawings in which.

DETAILED DESCRIPTION OF THE PRESENT INVENTION

Figure 1:
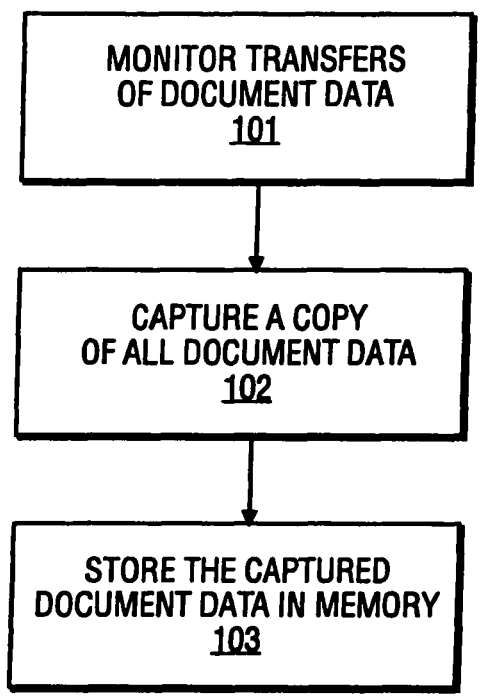
FIG. 1 illustrates a flow diagram of the archiving performed by the present invention.

An apparatus and method for document and data storage is described. In the following description, numerous details are set forth, such as specifies number of signals, types of data and storage formats, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions described below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also as discussed below, the present invention relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMS, magnetic or optical cards, or any type of media suitable for storing electronic instructions, and each coupled to a computer system bus. The algorithms presented herein are not inherently related to any particular computer or other apparatus. Various general purpose machines may be used with programs in accordance with the teachings herein, or it may prove convenient to construct more specialized apparatus to perform the required steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides for processing documents in a computer system so as to automatically archive document data that is being transferred between a computer system and some peripheral device (or network interface). The present invention sets forth executing a command to transfer a document between a processing device, such as a processor in a computer system, and a peripheral device such as a printer, fax machine, copier, network interface (to send/receive electronic mail messages), or any other network type of peripheral device. The execution of the command is performed during execution of an application program in the computer system. In response to the command, the document is transmitted between the processing device and the peripheral device. Also, in response to the command and transparent to the application program, the document data is archived in a memory in (or attached to and accessible by) the computer system. In one embodiment, the archiving is also performed transparent to the operating system running on the computer system.

For the purposes of the present invention, an application program may refer to a program, module or set of instructions or executable code. Note that the application programs of the present invention may enable or cause the transfer of document data within the computer system.

In one embodiment of the present invention, the archiving of documents occurs from running software in the computer system that monitors device drivers for the peripheral device. When the device drivers operate to transfer document data to a peripheral device, or vice versa, the document data is captured and converted into an image and both the original format of the data (e.g., postscript) and the image are stored in the memory in a computer system. In alternative embodiment, only the image is stored.

The memory that stores the archived document data may be one or more of many memories in the computer system. In one embodiment, the memory is partitioned between a file archiving system and a document archiving system. That is, the memory is divided to store archived document data as well as files that are used by various programs that may be run on the computer system.

In one embodiment, the document data is stored as entries in a database maintained in the memory. The memory could be the hard drive, random access memory (dynamic or static), cache memory, optical storage, other auxiliary memory in the computer system, or a memory in a remote storage facility. Furthermore, the database or memory may be maintained in a peripheral device designed for document image storage (e.g., a paperless printer).

The present invention operates with numerous peripheral devices each of which may be an input/output (I/O) device or a device coupled to a network interface in the computer system.

In the present invention, the computer system provides access to archived documents via an interface. In one embodiment, the interface may be a browser, such as Internet and World Wide Web browsers. The interface may provide access to both the archived documents and files stored in the memory.

FIG. 1 illustrates a flow diagram of the archiving process of the present invention. The archiving process is performed by processing logic. The processing logic may be hardware, software or a combination of both. Referring to FIG. 1, the archiving process begins by processing logic monitoring transfers of document data between at least one processing device running application programs in the computer system and peripheral devices in the computer system (processing block 101). Then, processing logic captures a copy of all document data generated as outputs by the application programs running on a computer system transparently to those application programs (processing block 102). The processing logic then stores the captured document data in memory in the computer system (processing block 103). The capturing of the document data may be such that every time a document is sent to a device via a device driver, (or otherwise), a copy may also be sent to the archiving portion of a memory. This may be done in the same manner as printing to a file.

Note that the present invention may be extended to not only save copies of documents being transferred, but also save each version of a document being generated. Thus, the present invention provides for archiving each version of a document by capturing versions of the document at one or more predetermined times or according to a predetermined time interval.

Figure 2:
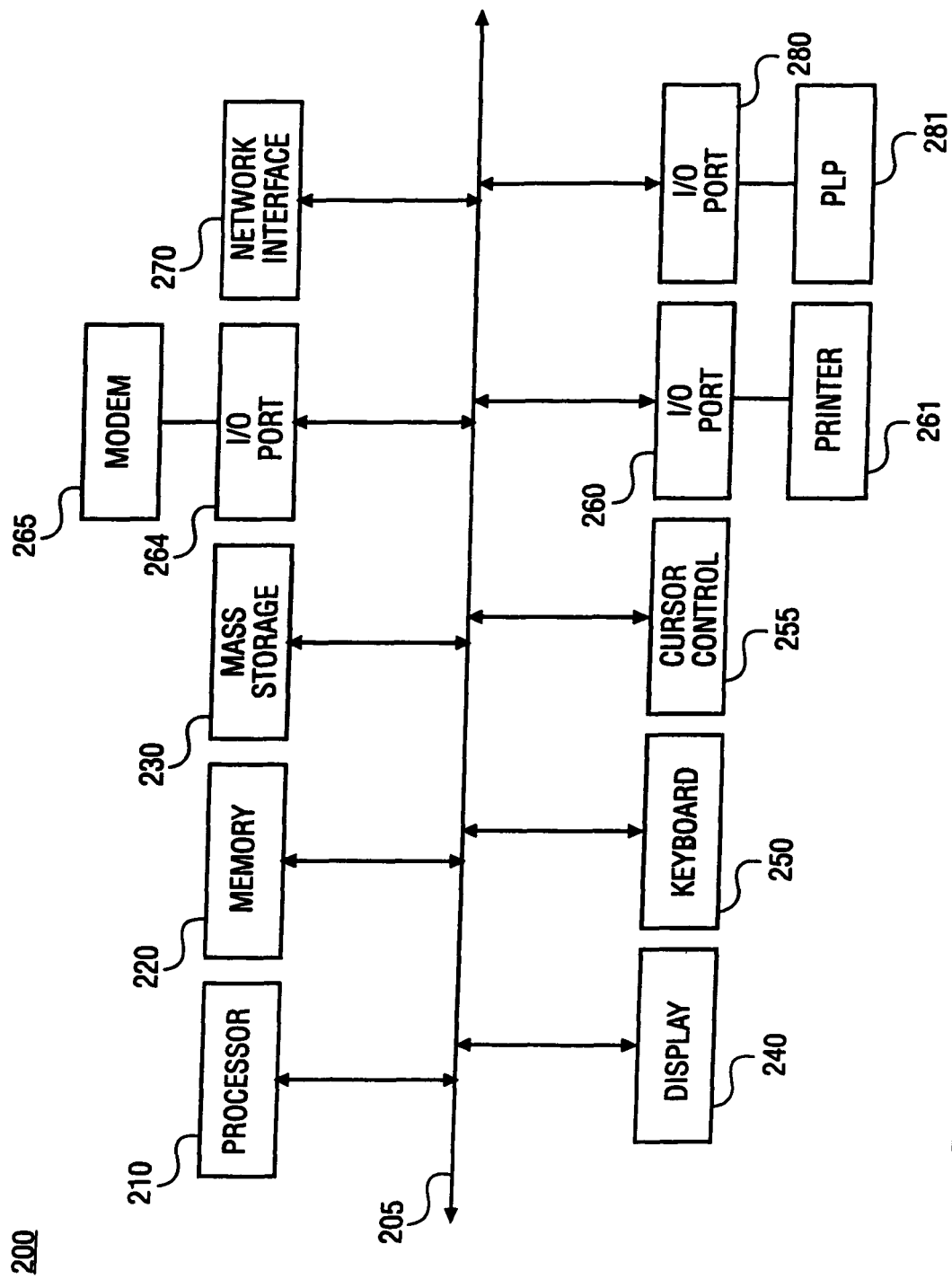
FIG. 2 illustrates a block diagram of one embodiment of a computer system of the present invention.

FIG. 2 illustrates one embodiment of a computer system 200 that performs automatic document archiving according to the present invention. Computer system 200 includes a bus 205 for communicating information and a processor 210 coupled to bus 205 for processing information (e.g., executing application programs). Computer system 200 further includes a random access memory (RAM) or other dynamic storage device 220 (referred to as memory), coupled to bus 205 for storing information and instructions to be executed by processor 210. The instructions may include application programs, an operating system, and other software programs, and code modules that may facilitate operations of the present invention. Memory 220 may also be used for storing temporary variables or other intermediate information during execution of instructions by processor 210. Computer system 200 also includes a mass storage device 230 (e.g., magnetic disk, optical disk, etc.) coupled to bus 205 for storing information and instructions.

Computer system 200 may further include a display device 240, such as a cathode ray tube (CRT) coupled to bus 205 for displaying information to a computer user. An alphanumeric input device (keyboard) 250 may also be coupled to bus 205 for communicating information and command selections to processor 210. An additional user input device is cursor control 255, such as a mouse, a trackball, or cursor direction keys, coupled to bus 205 for communicating direction information and command selections to processor 210.

Input/Output (I/O) ports 260, 264 and 280 may also be coupled to bus 205. I/O port 260 is coupled to printer 261 which may be used for printing information on a medium such as paper, film, or similar types of media. Also, computer system 200 may include a modem 265 coupled to I/O port 264 for sending and receiving information to and from other computer systems or facsimile machines. Computer system 200 may further include a paperless printer (PLP) 281 that is coupled to I/O port 280. PLP 281 may comprise a file server to store digital images of documents. The addition of PLP 281 may free up storage space in mass storage 23Q. In alternative embodiments, I/O ports 260, 264 and 280 may be coupled to other peripheral devices (e.g., a digital camera).

Finally, computer system 200 includes a network interface 270 coupled to bus 205. Network interface 270 provides signals to the computer system that are necessary to interface with a local area network (LAN) (not shown to avoid obscuring the present invention). Network interface 270 transmits and receives electronic mail, as well as other information, to and from other computer systems on the LAN. In alternative embodiments, network interface 270 may interface with other network systems (e.g., wide area network (WAN) systems, the Internet, etc.).

The devices and subsystems embodied in FIG. 2 may be coupled in different ways. In addition, many other devices or subsystems (not shown) may be coupled in a similar manner. Further, it is not necessary for all devices shown in FIG. 2 to be present to practice the present invention.

Figure 3:
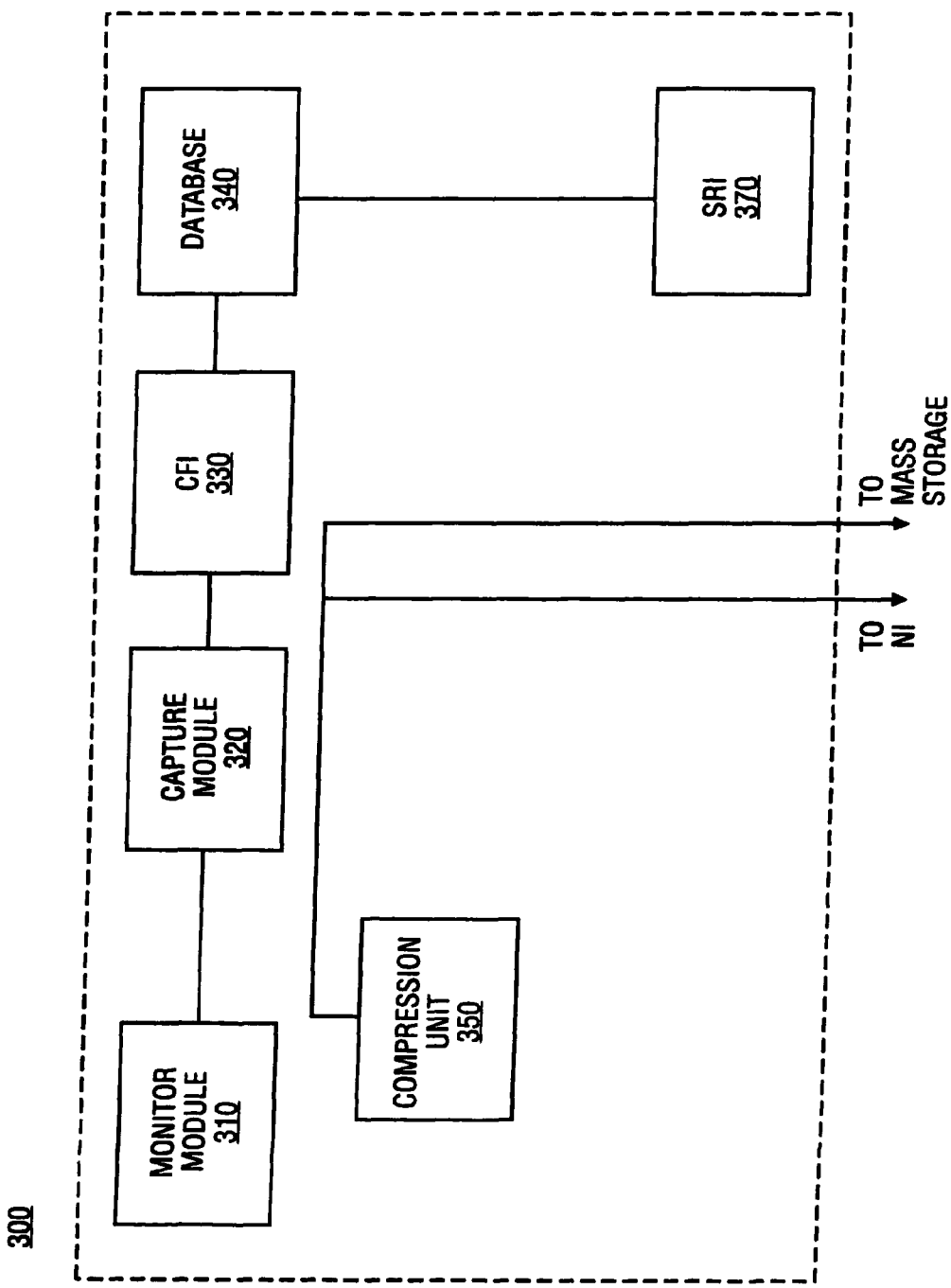
FIG. 3 illustrates one embodiment of an Image Management system of the present invention.

FIG. 3 illustrates an Image Management (IM) system 300 according to one embodiment of the present invention. In the present invention, IM system 300 automatically archives documents that are transmitted to printer 261, modem 265, or network interface 270. The documents may be stored as digital images. To that end, IM system 300 coverts document data into images, where necessary, for storage in the computer system.

In one embodiment, IM system 300 comprises a monitoring module 310, a capture module 320, a conversion of formats and indexing module (CFI) 330, a database module 340, a compression unit 350, and a search and retrieval interface (SRI) 370. In one embodiment, each of these modules comprises hardware (e.g., hardwired logic), software, or a combination of both. According to one embodiment, IM system 300 may be operably disposed in memory 220. In addition, IM system 300 may activate or deactivate the archiving function in a selectable manner. In alternative embodiments, IM system 300 may be stored in mass storage 230 or a remote storage system.

According to one embodiment, monitoring module 310 monitors the activity of device drivers for network interface 270 and I/O ports 260 and 264 for an indication (e.g., signal, interrupt) to indicate that a document is being transferred. In an alternative embodiment, the address bus may be monitored to identify if an address associated with one of these devices is being transferred, thereby indicating the transfer of a document. These indications are made in response to a user command to deliver a document in an executing application program, causing the document data to be transferred to the destined I/O port, network interface 270, or other peripheral device location. In one embodiment, prior to the document data being transferred to printer 261, modem 265 or network interface 270, an interrupt signal may be sent to initiate the transaction. In this case, monitoring module 310 detects the interrupt signal as the signal is received at either network interface 270, I/O port 260 or I/O port 264.

Capture module 320 may capture all electronic activities performed by the computer processing being performed. For instance, if changes are being made to a document (or file), the versions may be archived automatically and transparently to the application program(s) making their changes. This capture of information may be done periodically or at some specified time (e.g., at the end of the day, at the occurrence of one or more events, etc.) and may be performed much in the same manner as a UNIX dump operation or a well-known comparison operation between current versions of documents and older or previously archived versions of documents.

Capture module 320 communicates with monitoring module 310 to trap a copy of the document data subsequent to monitoring module 310 detecting the activity of the device drivers, such as, for instance, the peripheral's address, an indication, or a signal (e.g., an interrupt signal). Capture module 310 also taps the document data path to enable CFI 330 to process the document data. In one embodiment, capture module catches the document data as the data is sent to its destination device. In an alternative embodiment, capture module 310 may divert the document delivery path through CFI 330 prior to it reaching its destination and the release the data path to CFI 330 in order for document data to be transmitted to the original destination after CFI 330 has completely received the document data.

CFI 330 communicates with capture module 320. In one embodiment, CFI converts the format of the received document data to a desired format for storage in database 340. The document data may be retrieved by CFI 330 in a format generated by an application software package used to generate the document delivery. In the present embodiment, the desired format is Postscript. However, one of ordinary skill in the art will appreciate that other formats may be selected (e.g., GIFF, TIFF, PDF, PCL, FLAS4PIX, plain text, etc.). In alternative embodiments, CFI 330 may not be necessary to convert document data that is received in a format that is acceptable for storage.

Additionally, CFI 330 may apply an indexing system to the documents to be archived in database 340. The indexing system generates index information. The index information may comprise keywords, text, or symbols appearing in the document data, an indication of the application that generated the document data, its destination source address, an address, and/or a low resolution "iconic" representatives for the sage images in the document. The index information generated for a document facilitates full text and document searching later.

Database 340 maintains an archive of documents received from CFI 330. Database 340 may be a relational database that uses clustering which may be context-based (e.g., text) or driver-based (saving data with a file extension associated with the application that generated the document).

In one embodiment, database 340 may be stored in mass storage 230. In an alternative embodiment, database 340 may be stored in other storage devices. In yet another embodiment, IM system 300 allows a user to select between multiple storage devices. In such an embodiment, a user may have the option to select whether database 340 is stored in mass storage 230, PLP 280, or a remote storage facility (also not shown) coupled to network interface 270 via a LAN or WAN system.

Compression unit 350 communicates with capture module 320. Compression unit 350 may compress document data in accordance with a transmission standard (e.g., Facsimile Group III). Note that comparison unit 350 may not be necessary where a reduction in the amount of data being stored is not desired or needed. The compressed document data is transmitted through I/O port 264 to modem 265.

Modem 265 modulates a carrier with the compressed data in accordance with a relevant facsimile transmission standard to generate a modulated signal to output on a telephone line (not shown). The document data is transferred to printer 261 through I/O port 260.

In an alternative embodiment, the document data may be transmitted to network interface 270. In such an embodiment, printer 261 and modem 265 are coupled to network interface 270 via a LAN or WAN system. Thus, all print and fax requests on computer system 200 may be forwarded to a printer and modem, respectively, on a LAN system through network interface 270. One of ordinary skill in the art will recognize that alternative methods may be used to forward print and fax document data to a LAN system without departing from the spirit of the invention.

SRI 370 communicates with database 340. SRI 370 provides access to database 340 in order to search and retrieve archived documents. In one embodiment, SRI 370 may search and retrieve electronic files stored in computer system 200 as well as document images archived in database 340. In another embodiment, SRI 370 may conduct searches and make retrievals utilizing an association between electronic files stored on a user's computer system and archived documents. This is enabled by capturing (in capture module 320) the location of the original source file from which the document was created. This allows users to easily retrieve all captured versions of a given source document. Also, documents returned as the result of a query to database 340 may include links to the original document from which they were created. This allows users to easily invoke the appropriate application software (e.g., Microsoft Word, etc.) so they can modify the original document. In yet a further embodiment, IM system 300 allows SRI 370 to automatically discover links between captured documents and electronic originals. This operation may be performed in different ways. For instance, in U.S. Pat. No. 5,465,353, entitled "Image Matching and Retrieval by Multi-Access Redundant Hashing", issued Nov. 7, 1995, sequences of word lengths are extracted from both captured documents and originals. Links are constructed between two documents if they contain a large number of sequences in common. In U.S. patent application Ser. No. 08/695,825, entitled "Matching CCITT-compressed document images", filed Aug. 1, 1996, patterns of pass codes in CCITT-compressed documents are matched to discover links between image documents that are compressed in this format.

Further, SRI 370 may retrieve a subset of all archived electronic files. For example, an IM system 300 user may select a subset corresponding to all printed documents stored in database 340. In addition, SRI 370 may automatically compute type classifications based upon their content. For example, business letters are easily distinguished from other documents by easily computed characteristics of their images. Techniques such as that described in U.S. Pat. No. 5,642,288, entitled "Intelligent Document Recognition and Handling", issued Jun. 24, 1997, could be used for this purpose.

In an alternative embodiment, IM system 300 may automatically archive a digital image of documents any time a document file is saved. In this embodiment, monitoring module 310 polls computer system 200 for, and detects, a command to write an electronic document to mass storage 230. Capture module 320 obtains a copy of the document data and forwards the copy to CFI 330, subsequent to monitoring module 310 detecting activity of the device drivers (e.g., an interrupt generated). Capture module 310 may further release the data path to the initial destination after CFI 330 has completely received the document data. CFI 330 converts the format of the received document data to a desired format, as well as indexing the data, for storage in database 340. Database 340 maintains an archive of documents. According to one embodiment, database 340 is stored in PLP 280. However, one skilled in the art will appreciate that database 340 may be stored in memory 220, mass storage 230 or other types of storage devices.

In yet another embodiment, a calendar user interface may be included in IM system 300. This interface displays associations between events (e.g. appointments, meetings, trips) and documents captured at the time these events occurred in a metaphor (the calendar) that is familiar to users. The events may be recorded in a calendar manager software application. Calendar views are created that merge events and representations for documents (e.g., document icons hyperlinked to an archived version of the document).

Figure 4:
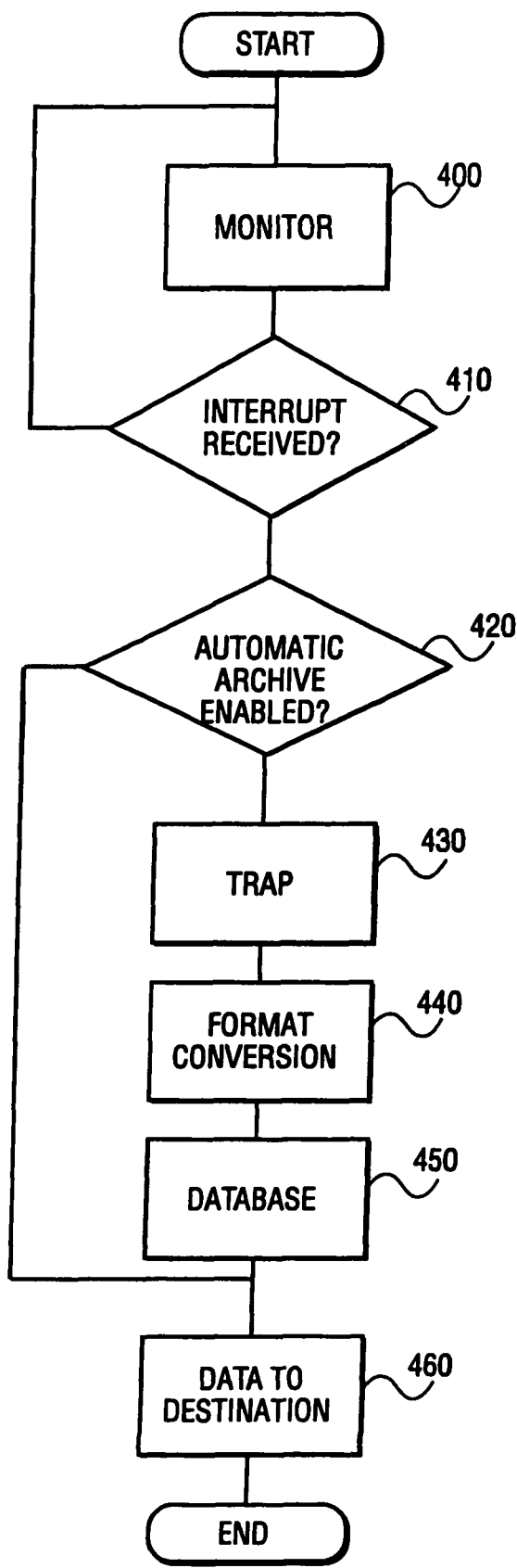
FIG. 4 illustrates a flow chart of the processing of the Image Management system of the present invention.

Referring to FIG. 4, a flow diagram of the operation of IM system 300 is illustrated. Initially, processing logic of IM system 300 monitors device activity associated with I/O ports 260 and 264 and network interface 270 preceding document data to be delivered to printer 261, modem 265, or to another computer system peripheral, respectively (processing block 400). In addition, processing logic of IM system 300 may poll computer system 200 for a command to write to mass storage 230. Then, processing logic determines whether such activity occurred (e.g., an interrupt signal is received) (processing block 410). If the activity is not detected, processing logic of IM system 300 continues to poll. Next, processing logic determines whether the automatic archiving option is enabled (processing block 420).

If the automatic archiving function of IM system 300 is enabled, capture module 320 obtains the document data and sends it to CFI 330 (processing block 430). Thereafter, CFI 330 converts the format of the received document data to a desired format (processing block 440). In addition, the document data is indexed for storage in database 340. Next, the converted document data is transferred to database 340 where it is stored (processing block 450). The document data is also sent to mass storage 230 (processing block 460). Alternatively, document data is transferred to compression unit 350 for faxing, print driver 360 for printing, or network interface 270 for sending electronic mail. If the automatic archiving function is disabled, the document data is written directly to mass storage 230, or transmitted to the appropriate peripheral device or network interface. In an alternative embodiment, IM system 300 transmits the document data to its destination before archiving. In yet another embodiment, IM system 300 alternates between transmitting document data to the destination device and archiving the document data.

It is apparent that no explicit action is required by a user to archive a document. Consequently, the time consuming process of scanning documents is no longer necessary. In addition, due to the guarantee that in one embodiment every document produced is archived, document management is significantly improved.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from the spirit and essential characteristics. References to details of particular embodiments are not intended to limit the scope of the claims.

What is claimed is:

1. A method for providing unconscious archiving and printing of documents in an automated office environment in which electronic documents are transferred to a printing engine and having at least one memory disposed to receive electronic copies of the documents for archiving, the method comprising:

printing document data using the print engine in response to a single user input command received by an application program to print the document data without indication to the user of additional processing of the document data;

detecting activity of a device driver to transfer document data from the application program to the print engine;

in response to detecting the transfer of the document data from the application program to the print engine by the device driver, capturing a copy of the document data in a document delivery path from the application program to the print engine as the document data is transferred to the print engine, wherein capturing the copy of the document data as the document data is transferred to the print engine further comprises:

diverting the document data from the document delivery path prior to receipt of the document data by the print engine, determining when all data corresponding to the document data has been diverted, generating the copy from the diverted document data based on the determination, and releasing the document data back into the document delivery path for transfer to the print engine after the copy of the document data has been generated;

determining the copy of the document data corresponds to a new version of an archived document;

generating version data that links the new version of the archived document to the archived document;

generating an image of the document from the copy of the document data for storage in the memory;

generating index information that comprises at least one of keyword, text or symbol data appearing in the copy of the document data; and causing the copy of the document data, the version data, the generated image of the document, and the index information to be stored in the memory to perform the unconscious storing transparently to the application program, and without input from the user and without notification to the user of the archiving of the document data notwithstanding the single user input command, and the aforementioned steps store electronic documents when printed.

2. The method defined in claim 1 further comprising retrieving the copy of the document data from the memory.

3. The method defined in claim 1 further comprising creating information for subsequent retrieval of the copy of the document data.

4. The method defined in claim 1 further comprising compressing the copy of the document data prior to storage in the memory.

5. The method defined in claim 1 further comprising subsequently invoking an application that caused the document data to be printed.

6. The method defined in claim 5 wherein the application comprising Microsoft Word.

7. The method defined in claim 1 wherein the copy of the document data is stored as an entry in a database maintained in the storage device.

8. The method defined in claim 1 further comprising capturing a source filename of the document.

9. The method defined in claim 1 wherein storing the copy of the document data is performed transparently to the operating system.

10. The method defined in claim 1 wherein the document image is stored in a text file format.

11. The method defined in claim 1 further comprising requesting a subset of all documents stored based on object type.

12. The method defined in claim 11 further comprising requesting a subset of all documents stored based on application program type.

13. The method defined in claim 1, wherein the copy of the document data, the converted document data, and the index information are stored in a relational database in the memory, wherein the relational database uses context-based clustering.

14. The method of claim 13, wherein the index information stored in the relational database enables full text and document searching against the copy of the document data stored in the relational database.

15. The method of claim 1, wherein an image management system taps the document delivery path to catch and divert the document data as the data is begin sent to the print engine.

16. A computer system comprising:

at least one peripheral device;

a memory storing at least one application program;

a bus coupled to the memory and the at least one peripheral device;

a processor coupled to the bus, the processor running the at least one application program to automatically capture a document created and printed during execution of a second application program, and store the captured document in the memory transparently to the second application program and a user in response to a single user input command to print the document from the second application program without input from the user to archive the document and without notification to the user that the document is to be archived, wherein the at least one application program run by the processor is to detect activity of a device driver to transfer document data from the second application program to a print engine of the at least one peripheral device, capture a copy of the document data in a document delivery path from the second application program to the print engine as the document data is transferred to the print engine, wherein capture of the copy of the document data as the document data is transferred to the print engine further comprises the application program run by the processor to divert the document data from the document delivery path prior to receipt of the document data by the print engine, determine when all data corresponding to the document data has been diverted, generate the copy from the diverted document data based on the determination, and release the document data back into the document delivery path for transfer to the print engine after the copy of the document data has been generated, determine the copy of the document data corresponds to a new version of an archived document, generate version data that links the new version of the archived document to the archived document, generate an image of the document from the copy of the document data for storage in the memory, generate index information that comprises at least one of keyword, text or symbol data appearing in the copy of the document data, and cause the copy of the document data, the version data, the generated image of the document, and the index information to be stored in the memory transparently to the second application program in response to detection of the transfer.

* * * * *